(12) United States Patent
Kim et al.

(10) Patent No.: US 11,082,955 B2
(45) Date of Patent: *Aug. 3, 2021

(54) METHOD AND DEVICE FOR TRANSMITTING/RECEIVING DATA USING TRANSPORT BLOCK SIZE DEFINED FOR MACHINE TYPE COMMUNICATION TERMINAL IN WIRELESS ACCESS SYSTEM SUPPORTING MACHINE TYPE COMMUNICATION

(71) Applicant: LG ELECTRONICS INC., Seoul (KR)

(72) Inventors: Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

This patent is subject to a terminal disclaimer.

(21) Appl. No.: 16/679,116

(22) Filed: Nov. 8, 2019

(65) Prior Publication Data
US 2020/0077367 A1 Mar. 5, 2020

Related U.S. Application Data

(63) Continuation of application No. 15/572,474, filed as application No. PCT/KR2016/004761 on May 4, 2016, now Pat. No. 10,484,971.
(Continued)

(51) Int. Cl.
*H04W 72/04* (2009.01)
*H04W 4/70* (2018.01)
(Continued)

(52) U.S. Cl.
CPC ............ *H04W 72/04* (2013.01); *H04W 4/70* (2018.02); *H04W 28/02* (2013.01); *H04W 52/02* (2013.01);
(Continued)

(58) Field of Classification Search
CPC ....... H04W 72/04; H04W 4/70; H04W 28/02; H04W 52/02; H04W 72/042; H04W 88/02
(Continued)

(56) References Cited

U.S. PATENT DOCUMENTS 9,843,429 B2 12/2017 Yi et al.
10,484,971 B2 11/2019 Kim et al.
(Continued)

FOREIGN PATENT DOCUMENTS

WO 2013069984 5/2013
WO 2014021632 2/2014
(Continued)

OTHER PUBLICATIONS

PCT International Application No. PCT/KR2016/004761, Written Opinion of the International Searching Authority dated Aug. 11, 2016, 15 pages.
(Continued)

*Primary Examiner* — Faisal Choudhury
(74) *Attorney, Agent, or Firm* — Lee, Hong, Degerman, Kang & Waimey

(57) ABSTRACT

The present invention relates to a wireless access system supporting machine type communication (MTC), and to various methods for an MTC terminal transmitting/receiving data. A method for an MTC terminal receiving data in a wireless access system supporting MTC, as one embodiment of the present invention, may comprise the steps of: receiving a modulation and coding scheme (MCS) index indicating a MCS, and a physical resource block (PRB) index indicating the size of a PRB allocated to a MTC terminal; checking a transport block size (TBS) index that is mapped with the MCS index and deriving a TBS on the basis of the TBS index and the PRB index; and on the basis of the TBS,
(Continued)

decoding a physical downlink shared channel (PDSCH) in order to receive data. Here, the size of the MCS index is configured to be a 4-bit size, and the TBS index may be configured so as to support only from 0 to 9 for the MTC terminal.

12 Claims, 11 Drawing Sheets

Related U.S. Application Data

(60) Provisional application No. 62/158,559, filed on May 8, 2015.

(51) Int. Cl.
| | | |
|---|---|---|
| *H04W 28/02* | (2009.01) | |
| *H04W 88/02* | (2009.01) | |
| *H04W 52/02* | (2009.01) | |
| *H04L 5/00* | (2006.01) | |
| *H04W 72/12* | (2009.01) | |

(52) U.S. Cl.
CPC ......... *H04W 72/042* (2013.01); *H04W 88/02* (2013.01); *H04L 5/0044* (2013.01); *H04L 5/0053* (2013.01); *H04W 72/1289* (2013.01); *Y02D 30/70* (2020.08)

(58) Field of Classification Search
USPC ....................................................... 370/329
See application file for complete search history.

(56) References Cited

U.S. PATENT DOCUMENTS

| | | | |
|---|---|---|---|
| 2013/0155974 A1* | 6/2013 | Papasakellariou .. | H04W 72/042 370/329 |
| 2013/0308572 A1* | 11/2013 | Sayana ................. | H04W 28/06 370/329 |
| 2014/0098761 A1* | 4/2014 | Lee ........................ | H04W 24/02 370/329 |
| 2014/0169297 A1* | 6/2014 | Kim ...................... | H04L 1/0016 370/329 |
| 2015/0296518 A1 | 10/2015 | Yi et al. | |
| 2016/0100422 A1 | 4/2016 | Papasakellariou et al. | |
| 2016/0205564 A1* | 7/2016 | Ren ........................ | H04L 27/362 370/252 |
| 2017/0105166 A1* | 4/2017 | Lee ........................ | H04W 48/12 |
| 2018/0115962 A1 | 4/2018 | Kim et al. | |
| 2018/0323940 A1 | 11/2018 | Rico Alvarino et al. | |
| 2019/0036640 A1 | 1/2019 | Xu et al. | |

FOREIGN PATENT DOCUMENTS

| | | |
|---|---|---|
| WO | 2014069945 | 5/2014 |
| WO | 2014088294 | 6/2014 |
| WO | 2015030523 | 3/2015 |

OTHER PUBLICATIONS

European Patent Office Application Serial No. 16792920.7, Search Report dated Nov. 15, 2018, 12 pages.
ZTE, "Discussion on Repetition for Control Channel and Traffic Channel", 3GPP TSG RAN WG1 Meeting #74, R1-133062, XP050716289, Aug. 2013, 9 pages.
U.S. Appl. No. 15/572,474, Office Action dated Feb. 15, 2019, 15 pages.

* cited by examiner

METHOD AND DEVICE FOR TRANSMITTING/RECEIVING DATA USING TRANSPORT BLOCK SIZE DEFINED FOR MACHINE TYPE COMMUNICATION TERMINAL IN WIRELESS ACCESS SYSTEM SUPPORTING MACHINE TYPE COMMUNICATION

CROSS-REFERENCE TO RELATED APPLICATIONS

This application is a continuation of U.S. patent application Ser. No. 15/572,474, filed on Nov. 7, 2017, now U.S. Pat. No. 10,484,971, which is the National Stage filing under 35 U.S.C. 371 of International Application No. PCT/KR2016/004761, filed on May 4, 2016, which claims the benefit of U.S. Provisional Application No. 62/158,559, filed on May 8, 2015, the contents of which are all hereby incorporated by reference herein in their entireties.

TECHNICAL FIELD

The present invention relates to a wireless access system supporting machine type communication (MTC), and more particularly, to methods for configuring a transport block size (TBS) for transmitting and receiving data in an MTC user equipment (UE), a modulation and coding scheme (MCS) index signaling method for the same, and methods for transmitting and receiving data and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide various methods for efficiently transmitting and receiving data in a wireless access system supporting MTC.

Another object of the present invention is to provide methods for configuring a TBS for supporting a narrow band for a MTC UE when a bandwidth supported by the MTC UE is relatively smaller than that supported by a general UE.

Still another object of the present invention is to provide a method for signaling an MCS index for a TBS when the TBS for an MTC UE is defined and a method for transmitting and receiving data.

Further still another object of the present invention is to provide devices for supporting the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a wireless access system supporting machine type communication (MTC), and more particularly, to methods for configuring a transport block size (TB S) for transmitting and receiving data in an MTC user equipment (UE), a modulation and coding scheme (MCS) index signaling method for the same, and methods for transmitting and receiving data and devices for supporting the same.

In one aspect of the present invention, a method for receiving data in an MTC UE in a wireless access system supporting machine type communication (MTC) comprises the steps of receiving a modulation and coding scheme (MCS) index indicating an MCS and resource allocation information allocated to the MTC UE; deriving a transport block size (TBS) by checking a TBS index mapped into the MCS index on the basis of the TBS index and the resource allocation information; and decoding a physical downlink shared channel (PDSCH) to receive the data on the basis of the TBS, wherein the MCS index is configured to have a 4-bit size, and the TBS index is configured to indicate only a part of TBS indexes of a TBS table configured to support a general UE.

In another aspect of the present invention, an MTC UE for receiving data in a wireless access system supporting MTC comprises a receiver; and a processor, wherein the processor is configured to receive a modulation and coding scheme (MCS) index indicating an MCS and resource allocation information indicating a resource block allocated to the MTC UE by controlling the receiver, obtaining a transport block size (TBS) by checking a TBS index mapped into the MCS index on the basis of the TBS index and the resource allocation information, and decode a physical downlink shared channel (PDSCH) by receiving the receiver to receive the data on the basis of the TBS, and wherein the MCS index is configured to have a 4-bit size, and the TBS index is configured to indicate only a part of TBS indexes of a TBS table configured to support a general UE.

A part of TBS indexes may range from TBS index 0 to TBS index 9 of the TBS table. At this time, the TBS may be obtained from some columns of the TBS table.

The TBS may be replaced with 88 bits if the TBS index is 6 in the TBS table and the smallest resource unit is allocated to the MTC UE.

The TBS may be obtained further considering a repetition transmission number of data.

It is to be understood that both the foregoing general description and the following detailed description of the present invention are exemplary and explanatory and are intended to provide further explanation of the invention as claimed.

Advantageous Effects

According to the embodiments of the present invention, the following effects are obtained.

First of all, in a wireless access system supporting an MTC, an MTC UE may efficiently transmit and receive data while minimizing power consumption of the MTC UE.

Secondly, if the MTC UE is operated at a narrow band, a TBS optimized for the MTC UE may be provided, whereby performance of the MTC UE may be maximized Thirdly, a new TBS size may be defined in the MTC UE or a new TBS table for supporting a new TBS may be designed, whereby data transmission and reception optimized for the MTC UE may be performed without reduction of performance of a general UE.

Fourthly, a size of an MCS index defined for the MTC UE is reduced from the existing 5 bits to 4 bits, whereby the amount of control information transmitted to the MTC UE may be reduced. This may reduce signaling overhead when DCI, (E)PDCCH, etc., which include control information, are repeatedly transmitted to the MTC UE.

It will be apparent to those skilled in the art that various modifications and variations can be made in the present invention without departing from the technical features or scope of the inventions. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
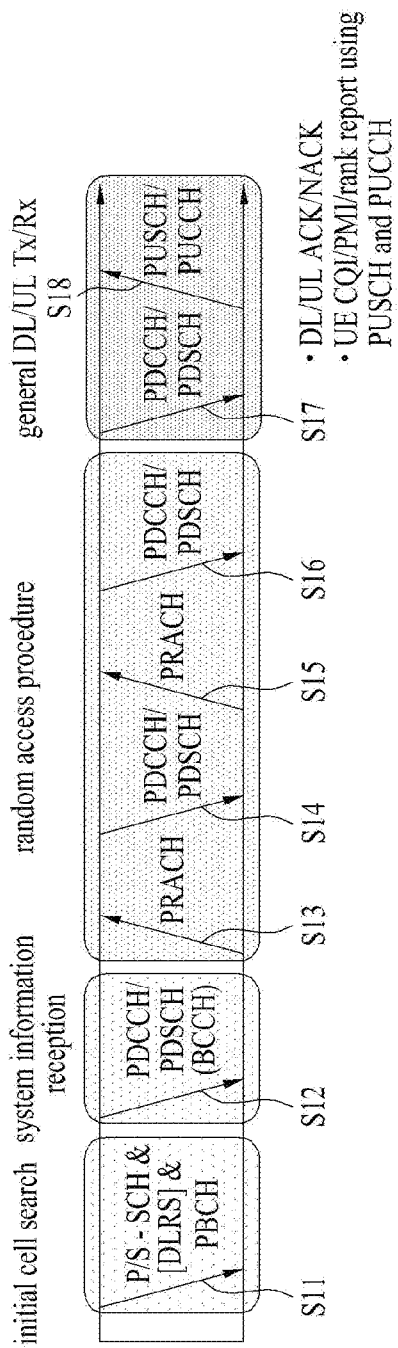
FIG. 1 is a conceptual diagram illustrating physical channels used in the embodiments and a signal transmission method using the physical channels.

The present invention relates to a wireless access system supporting machine type communication (MTC), and more particularly, to methods for configuring a transport block size (TBS) for transmitting and receiving data in an MTC user equipment (UE), various methods for configuring a TBS table, and devices for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems which are examples of a wireless access system which can be applied to embodiments to the present invention will be explained.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
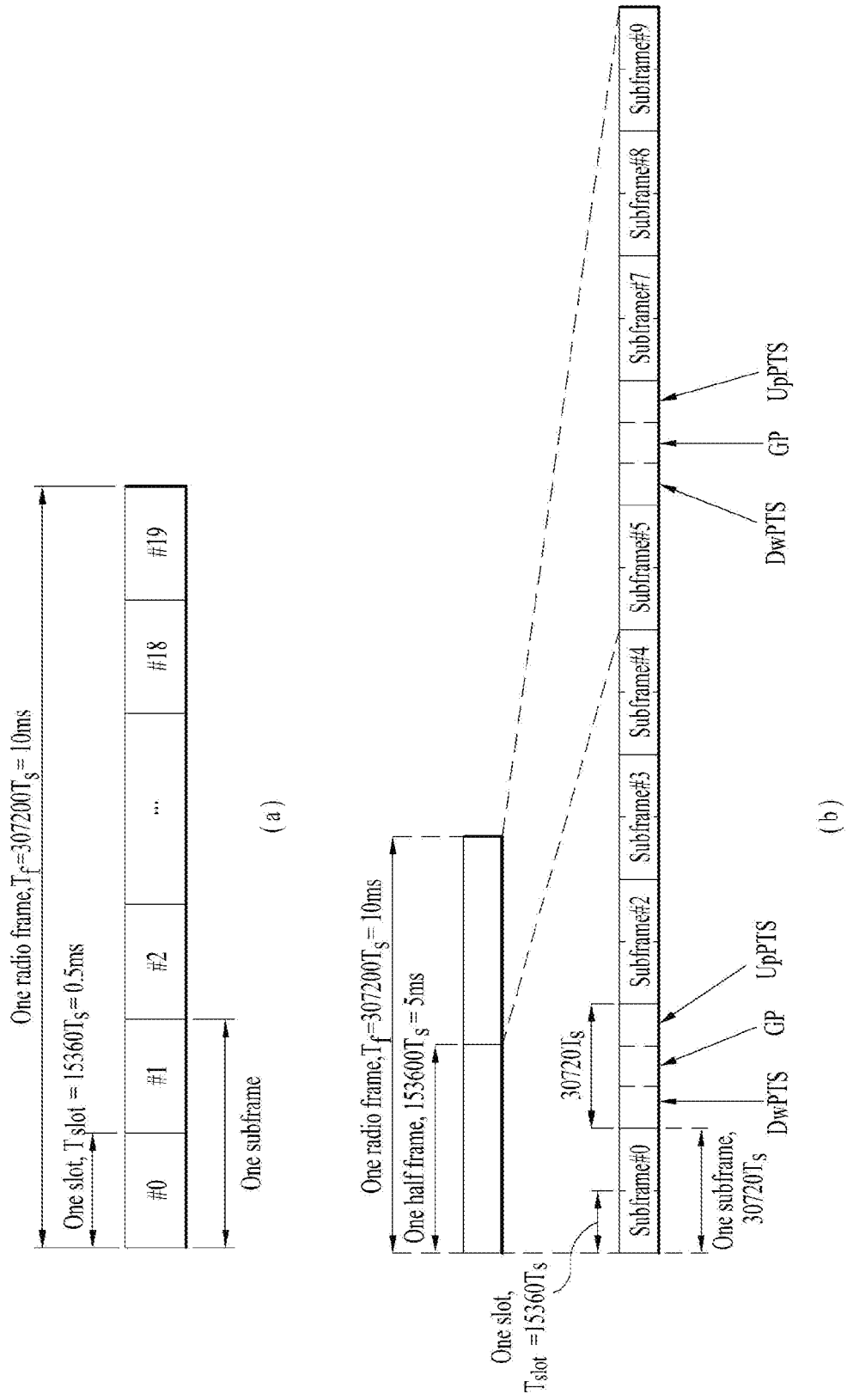
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
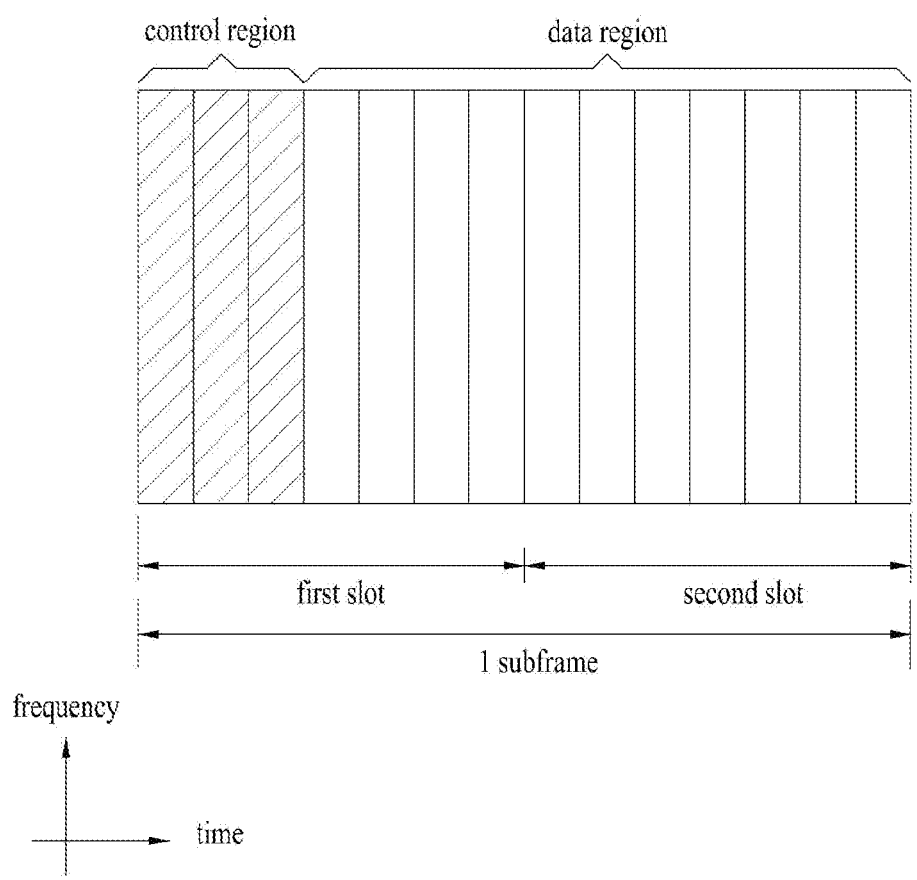
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

Figure 3:
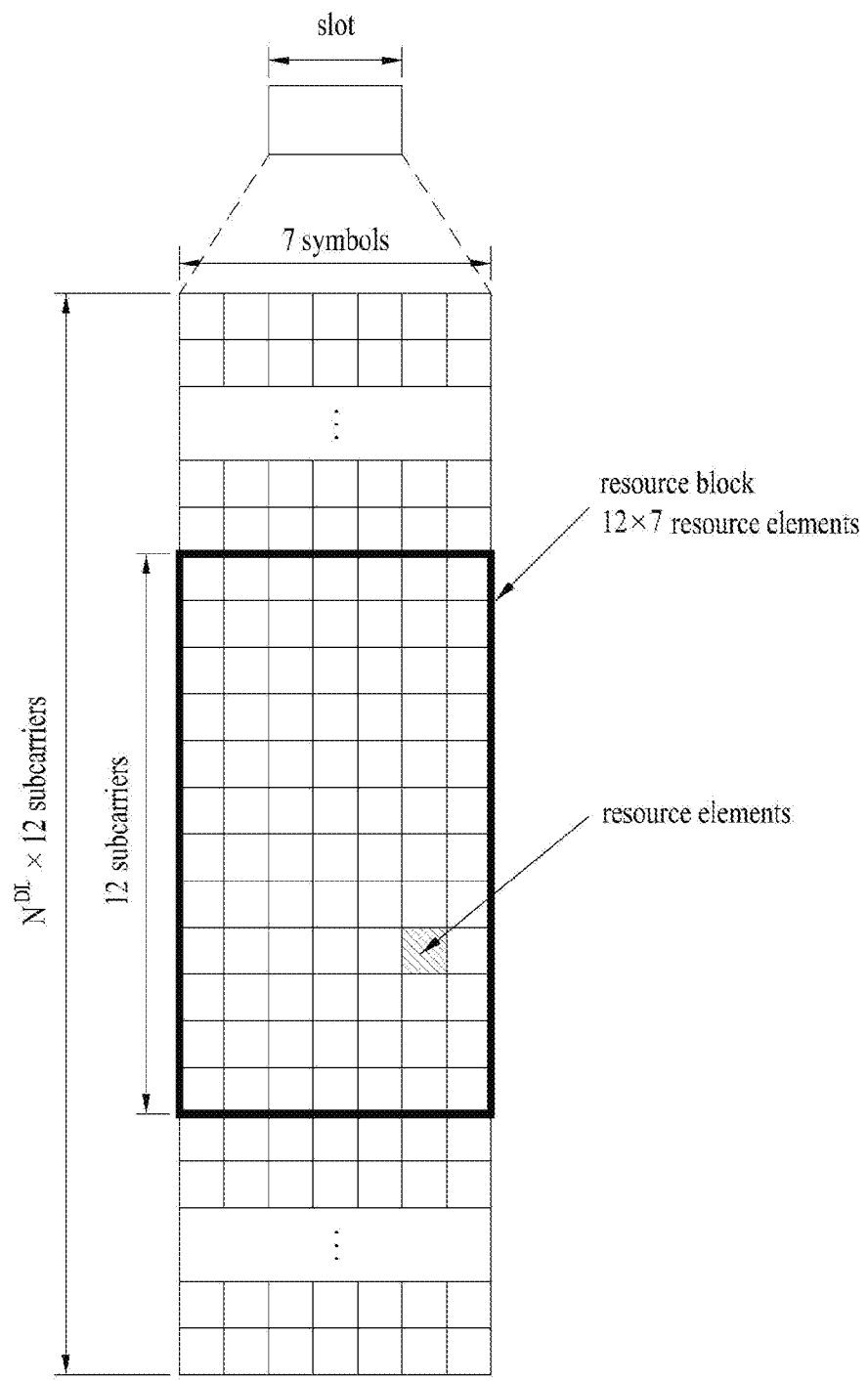
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
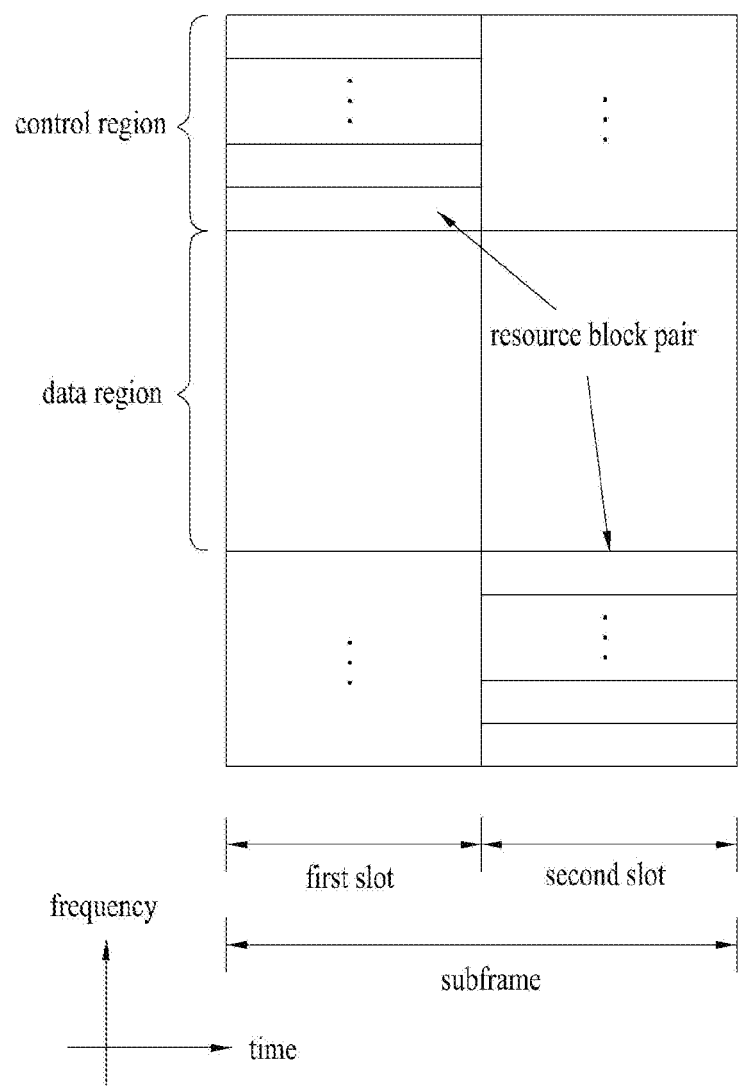
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs are allocated to a PUCCH for a UE. The RBs of the RB pair occupy different subcarriers in two slots. Thus it is said that the RB pair frequency-hops over a slot boundary.

Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |

TABLE 3-continued

| DCI Format | Description |
|---|---|
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher layer signaling (e.g. Radio Resource Control (RRC) signaling). The transmission mode may be classified as single antenna transmission or multi-antenna transmission.

A transmission mode is configured for a UE semi-statically by higher layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which does not based on a codebook (Rel-8);

(8) Transmission mode 8: Precoding supporting up to two layers, which do not based on a codebook (Rel-9);

(9) Transmission mode 9: Precoding supporting up to eight layers, which do not based on a codebook (Rel-10); and

(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k-1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \qquad \text{[Equation 1]}$$

where $M^{(L)}$ is the number of PDCCH candidates with CCE aggregation level L to be monitored in the SS, m=0, ..., $M^{(L)}-1$, is the index of a CCE in each PDCCH candidate, and i=0, ..., L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH cadidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

where $Y_{-1} = n_{RNTI} \neq 0$, $n_{RNTI}$ indicating an RNTI value. A=39827 and D=65537.

1.3 Method for Transmitting MCS Information

In order to transmit TBS of DL data to the UE, the eNB may use DL control channels (e.g, PDCCH/EPDCCH). In this case, the eNB combines MCS index indicating MCS associated information with resource allocation information, and transmits TB size information of the TB transmitted on a PDSCH to the UE.

For example, the MCS index ($I_{MCS}$) field may be configured with 5 bits, and may be assigned radio resources from 1 RB to 110 RBs. Accordingly, in the case of a non-MIMO scheme to which MIMO is not applied, signaling of a TBS (permitting a duplicate size) corresponding to {32 (states)× 110 (RBs)} is possible. However, three states (e.g., 29, 30, 31) from among the MCS index field transmitted using 5 bits may be used to indicate modification of the modulation scheme during retransmission. Therefore, signaling of a TBS corresponding to (29×110) is actually possible.

In the current LTE/LTE-A system, there are four modulation schemes supporting DL data transmission, i.e., Quadrature Phase Shift Keying (QPSK), 16QAM (Quadrature Amplitude Modulation), 64QAM and 256 QAM. The MCS index may indicate a modulation order and a TBS index, and the MSC index may indicate the same TBS although a different modulation scheme is used at a switching point at which the modulation scheme is changed, such that the MCS index can efficiently operate in various channel environments. The amount of information capable of being transmitted during a unit time may be slightly changed at a switching point at which the modulation scheme is changed, as compared to SINR (Signal to Interference plus Noise Ratio) variation. Therefore, although the modulation scheme is changed at the switching point, the same TBS is indicated so that radio resources can be efficiently allocated.

Considering the above-mentioned matters, the MCS index field (e.g, $I_{MCS}$) transmitted through a DL control channel is mapped to another variable (i.e., $I_{TBS}$) so as to indicate the actual TB size. The following Table 6 shows a modulation order and a TBS index ($I_{TBS}$) table according to the 5-bit MCS index ($I_{MCS}$) for use in the current LTE/LTE-A system.

TABLE 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

2. Carrier Aggregation (CA) Environment

2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
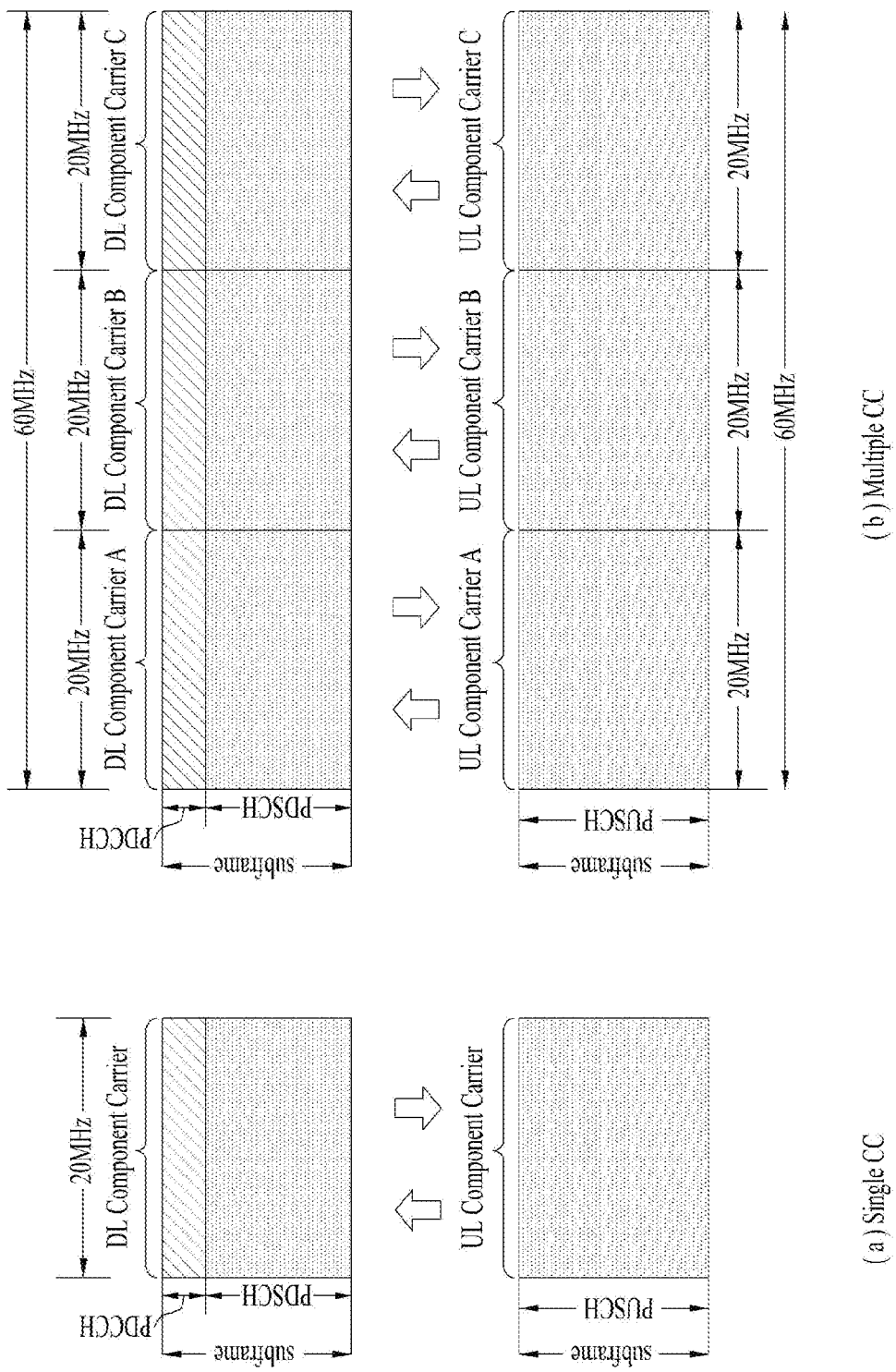
FIG. 6 is a diagram illustrating an example of a component carrier (CC) used in the embodiments of the present invention and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
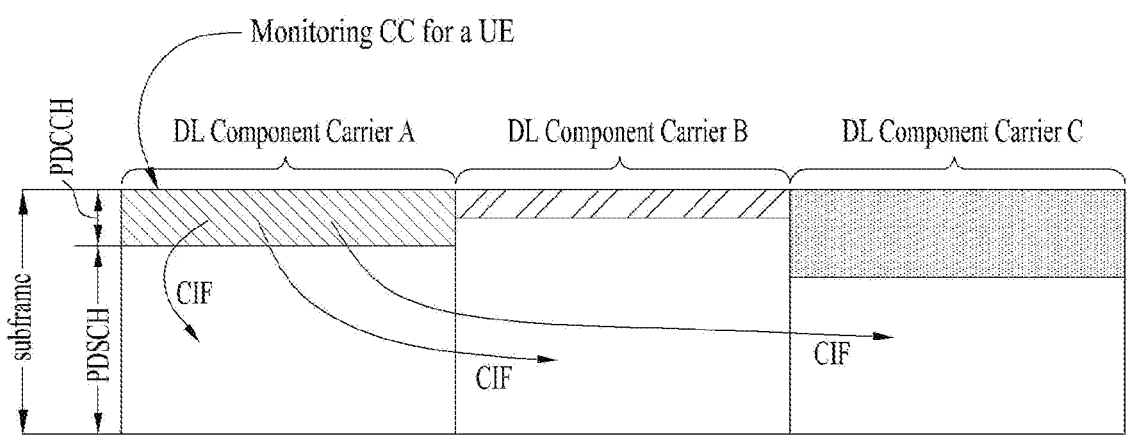
FIG. 7 illustrates a subframe structure of an LTE-A system according to cross-carrier scheduling used in the embodiments of the present invention.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
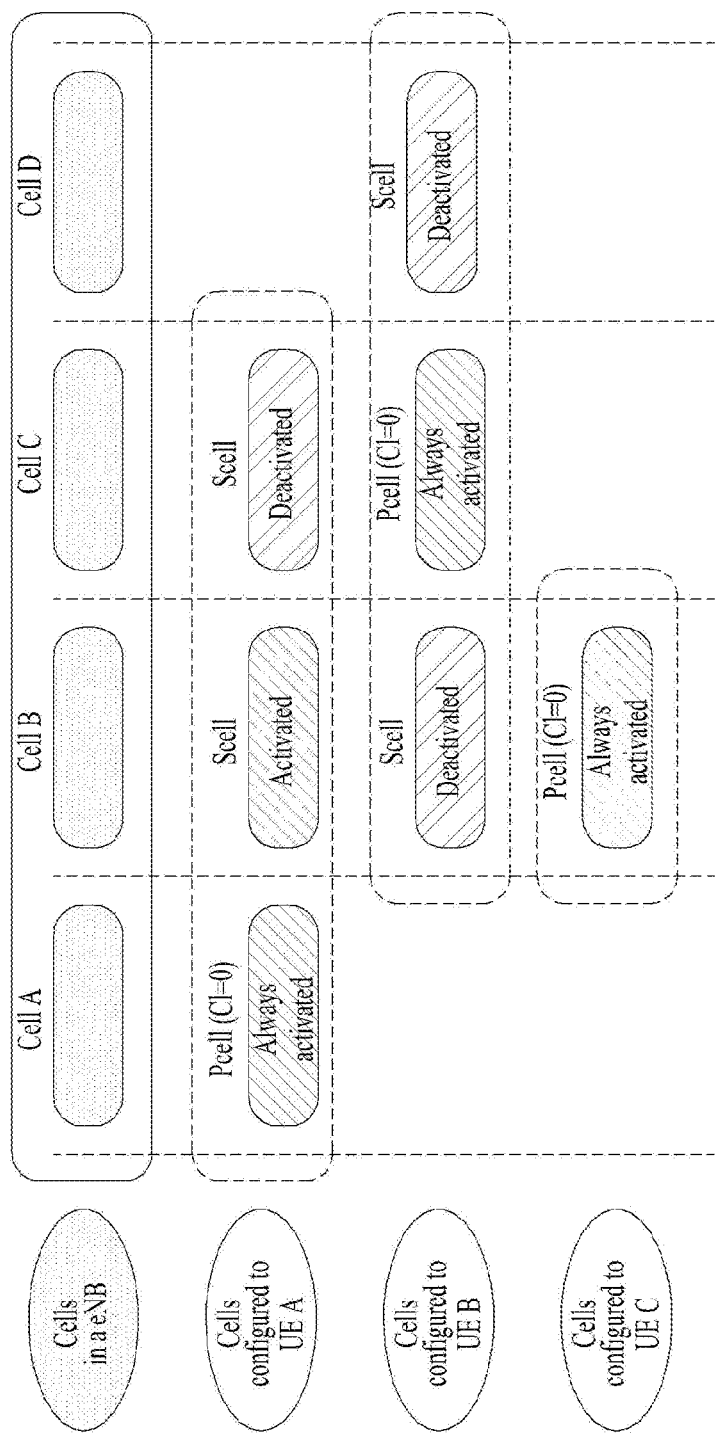
FIG. 8 is a diagram illustrating a configuration of serving cells according to cross-carrier scheduling used in the embodiments of the present invention.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Channel Encoding

A wireless access system performs coding of transmission information of a transmission end (or transmitter) using a forward error correction code, and transmits the coded information, so that channel errors can be corrected by a reception end (or receiver).

The reception end demodulates a received (Rx) signal, performs decoding of forward error correction code, and recovers transmission information. By the decoding process, errors of the Rx signal caused by a radio frequency (RF) channel can be corrected. Although various kinds of error correction codes can be applied to the embodiments, the embodiments will hereinafter be described using a turbo code as an example.

Figure 9:
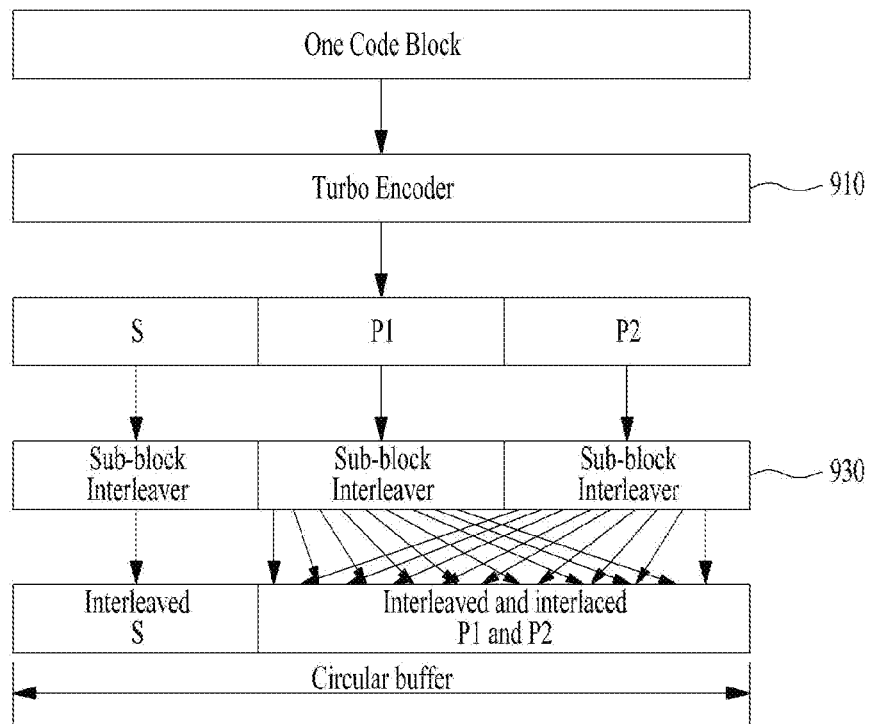
FIG. 9 is a diagram illustrating an example of rate matching using a turbo coder for use in the embodiments of the present invention.

FIG. 9 is a conceptual diagram illustrating an example of rate matching using a turbo coder for use in the embodiments.

Referring to FIG. 9, the turbo coder may include a recursive systematic convolution code and an interleaver. An interleaver for facilitating parallel decoding may be used when the turbo code is actually implemented. One kind of such interleaver may be Quadratic Polynomial Permutation (QPP). The QPP interleaver may indicate a performance suitable for a specific size of a transport block (i.e., a data block), and the turbo-code performance increases in proportion to the TB size. Accordingly, to conveniently implement the turbo code by the wireless access system, the wireless access system divides a predetermined-sized TB into a plurality of small-sized TBs, and encodes the small-sized TBs. In this case, each small-sized TB is referred to as a code block.

Generally, although these code blocks have the same size, one of several code blocks may have another size due to the limitation of the QPP interleaver size. The transmitter performs the error correction coding process on the basis of a code block of the interleaver. For example, as can be seen from FIG. 9, one code block is input to the turbo coder 910.

The turbo coder 910 performs ⅓ coding of an input code block, and outputs a systematic block and parity blocks (1, 2).

Thereafter, the transmitter performs interleaving of each block using the sub-block interleaver 930 so as to reduce influence of burst error encountered when data is transmitted through RF channels. The transmitter may map the interleaved code block to actual radio resources, and transmit the mapped result.

Since the amount of radio resources used for transmission is constant, the transmitter performs rate matching to the encoded code block so as to adjust the amount of radio resources to the amount of radio resources to be used for transmission. Generally, rate matching may be performed through puncturing or repetition of data.

Rate matching may be performed on the basis of an encoded code block unit as in WCDMA of 3GPP. In another method, the systematic block of the encoded code block and the parity blocks are separated from each other, such that independent interleaving may be performed for the separated systematic block and each parity block. As described above, FIG. 9 shows that the systematic block and the parity blocks are separated from each other so that rate matching is carried out.

A Cyclic Redundancy Code (CRC) for error detection is attached to a transport block (TB) transmitted from a higher layer of the transmitter, and CRC is attached to each code block separated from the TB. Various TB sizes need to be defined according to service categories of a higher layer. The transmitter may perform quantization to transmit TBs to the receiver. For TB quantization, a dummy bit is added in such a manner that a source TB transmitted from the higher layer can be adjusted for the size of TB of a physical layer. In this case, quantization may be preferably performed to minimize the amount of added dummy bits.

In accordance with the embodiments, the relationship among transport Block Size (TBS) modulation, MCS, and the number of allocated resources is a function. That is, the remaining one parameter is decided according to values of any two parameters. Accordingly, if the transmitter and/or the receiver perform signaling of the corresponding parameters, the transmitter and/or the receiver must inform the counterpart device of only two of three parameters.

For convenience of description and better understanding of the present invention, it is assumed that the transmitter uses parameters associated with MCS and the number of allocated resources so as to inform the receiver of a transport block size (TBS).

As exemplary factors capable of affecting the number of allocated resources, a pilot for performing channel estimation according to antenna construction, and resources used for transmission of RS (Reference Signal) and control information may be used. The above-mentioned factors may be changed every transmission moment.

4. Method for Configuring TBS for MTC UE 4.1 MTC UE

The LTE-A system (post-Rel-12 system) is a next generation wireless communication system and considers that a UE of low cost/low options based on data communication such as meter reading, water level measurement, usage of a surveillance camera and stock report of a vending machine. In the embodiments of the present invention, this UE will be referred to an MTC (Machine Type Communication) UE for convenience.

Since the MTC UE has a small amount of transmission data and uplink/downlink data transmission and reception occur sometimes, it is efficient to low unit cost of the UE to be matched with a low data transmission rate and reduce battery consumption. The MTC UE is characterized in little mobility, and therefore its channel environment is little changed. The current LTE-A considers that the MTC UE has coverage wider than the existing coverage. To this end, various coverage enhancement schemes for the MTC UE have been discussed.

The MTC UE may be installed in an area (e.g., basement) where a transmission environment is not better than that of the legacy UE (that is, general UE). If a relay or the like is installed for the MTC UE, much cost may be consumed for facility investment.

MTC is a communication mode for performing communication between devices without user intervention. As a representative application mode, smart metering may be considered. This is an application technique for periodically transmitting measurement information by attaching a communication module to a meter such an electric meter, a gas meter, or a water meter.

It is general that the electric meter, the gas meter or the water meter is operated by a battery built in a UE. If a manpower is used for battery exchange of the MTC UE, since additional cost is required, it is preferable to minimize power consumption to use the battery for a long time if possible.

Also, since it is considered that the UE which supports MTC is produced and spread at a low cost, the MTC UE may be designed to support only a narrow band (for example, 1RB, 2RB, 3RB, 4RB, 5RB or 6RB size or less) very narrower than that of a general cellular system. In this case, the MTC UE cannot perform decoding for a downlink control channel area transmitted through a full band of the legacy system in the same manner as the general cellular system, and cannot transmit control information to the downlink control channel area. For this reason, if the amount of control information for the MT UE is reduced, the amount of resources for data transmission of the MTC UE is also reduced.

Also, a high data rate is not required for the MTC UE in view of the characteristic of the MTC UE, a low data rate has to be only periodically fulfilled for the MTC UE. Therefore, additional deployment of a relay or eNB for a poor communication environment where the MTC UE is arranged may not be economical. The simplest method for overcoming the poor communication environment of the MTC UE is to repeatedly transmit data and/or control information, which will be transmitted or received.

However, in this case, a method for defining a new TBS for transmitting and receiving data to and from the MTC UE and supporting the MTC UE by using the existing network is required. Therefore, in the embodiments of the present invention, methods for configuring TBS optimized for the MTC UE will be described.

4.2 MCS Signaling Method for Reducing Size of MCS Index Size

The MTC UE may be configured to transmit and receive data at a narrow band (for example, band of 1RB, 2RB, 3RB, 4RB, 5RB or 6RB or less). Therefore, it is assumed that the MTC UE applied to the embodiments of the present invention is a UE to which resources up to 6RB may be applied. This MTC UE may be applied to a narrow band of another size in the same manner Also, it is assumed that an eNB supports both a general UE and the MTC UE, wherein the general UE means a UE operated in the legacy cellular system excluding the MTC UE. At this time, the legacy cellular system may mean the current LTE/LTE-A system.

Figure 10:
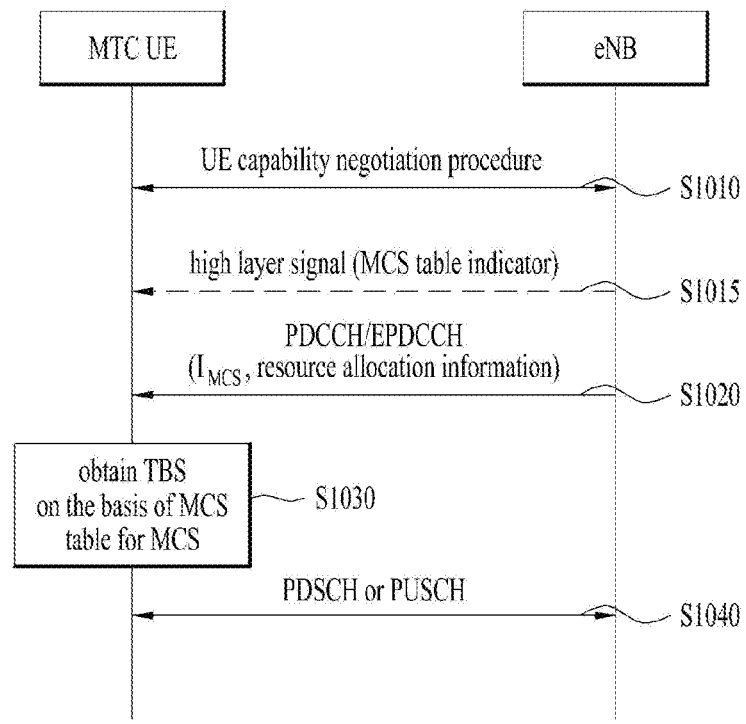
FIG. 10 is a diagram illustrating one of methods for transmitting MCS index for an MTC UE.

FIG. 10 is a diagram illustrating one of methods for transmitting MCS index for an MTC UE.

If the MTC UE is turned on and initially accesses or re-accesses a network, the MTC UE may perform a UE capability negotiation procedure with the eNB. At this time, the eNB may recognize that the UE is the MTC UE, and then may perform the operation for supporting the MTC UE (S1010).

At this time, the wireless access system that supports MTC may maintain and manage a first MCS table for supporting the general UE and/or a second MCS table newly defined to support the MTC UE.

Therefore, if the MTC UE accesses the system, the eNB may transmit a TBS table indicator for indicating MCS table to be used by the MTC UE to the MTC UE through a higher layer signal (S1015).

The step S1015 may be used selectively depending on the system. If the step S1015 is not used, the MCS table indicator may be transmitted to the MTC UE in step S1010. Alternatively, if a new MCS table for the MTC UE is not defined in the MTC UE, the first MCS table is only used, whereby the step S1015 may not be performed.

In the current LTE/LTE-A system, MCS indication through MCS index is performed by 5 bits as illustrated in Table 6. That is, the MTC index indicates MCS and TBS index to be used by the corresponding UE. However, the MTC UE may be configured so as not to support higher order modulation, whereby the cost required for implementation of the MTC UE may be reduced. For example, the MTC UE may be configured to support QPSK only or QPSK and 16QAM only.

Also, a buffer size of the MTC UE may be limited, whereby the cost required for implementation of the MTC UE may be reduced. For example, the MTC UE may be configured to limit a size of a TB, which may be processed by a buffer, to 1000 bits, approximately. If QPSK is only supported for the MTC UE, the MTC UE may be configured to support only $I_{MCS}$ 0~9 (equivalent to $I_{TBSS}$ 0~9) in Table 6. At this time, MCS table described in Table 6 may be used as the first MCS table, and the second MCS table will be described later. Also, a first TBS table is MCS table defined in the current LTE/LTE-A system, and a second TBS table will be described later.

The eNB may notify the MTC UE of $I_{MCS}$ and resource allocation information through PDCCH or E-PDCCH. At this time, the resource allocation information may indicate the number or size of resource blocks (pairs) allocated to the MTC UE (or NB-IoT UE) (S1020).

If the MTC UE is configured to support only $I_{MCS}$ 0~9 (equivalent to $I_{TBSS}$ 0~9) of the first MCS table, a size of $I_{MCS}$ transmitted in the step S1020 may be changed from the legacy 5 bits to 4 bits. As a result, since the amount of control information transmitted to the MTC UE may be reduced, if PDCCH or EPDCCH is repeatedly transmitted, data throughput may be increased during repeated transmission of PDDCH or EPDCCH.

The MTC UE may obtain $I_{TBS}$ based on $I_{MCS}$ received through the step S1020, and may obtain a TBS from the first TBS table or the second TBS table newly defined, on the basis of the obtained $I_{TBS}$ and resource allocation information. At this time, the TBS table which will obtain a TBS on the basis of the TBS index may be the same as the TBS table (that is, the first TBS table) defined for the general UE or the new TBS table (that is, the second TBS table) for the MTC UE (S1030).

Afterwards, the MTC UE may transmit PUSCH to the eNB or receive PDSCH from the eNB on the basis of the obtained TBS value (S1040).

Hereinafter, a new MCS table (that is, the second MCS table) defined for the MTC UE will be described.

4.3 Method for Configuring New MCS Table

Hereinafter, methods for configuring a new MCS table (that is, the second MCS table) for the MTC UE will be described as shown in FIG. 10.

If the MTC UE limits an available TB size to 1000 bits or less, $I_{MCS}$ 29~31 for changing a modulation scheme during retransmission may not be required. Therefore, the MCS table of Table 6 may be reconfigured as listed in Table 7. Also, a new TBS index for supporting an SINR area lowered through repeated transmission may be added, and a TBS index value, which has not been used conventionally, may be allocated to the new TBS index $I_{TBS}$. Table 7 illustrates one of the second MCS table.

TABLE 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 8 | 2 | 8 |
| 9 | 2 | 9 |
| 10 | 2 | 34 |
| 11 | 2 | 35 |
| 12 | 2 | 36 |
| 13 | 2 | 37 |
| 14 | 2 | 38 |
| 15 | 2 | 39 |

Table 7 is a TBS table corresponding to a case that QPSK is only supported. The MTC UE may be configured so as not to be supported by modulation schemes of 16QAM, 64QAM and 256QAM in consideration of complexity in implementation.

In another aspect of this embodiment, if QPSK and 16QSM are supported for the MTC UE, $I_{MCS}$ indexes 0~15 (equivalent to $I_{TBS}$ indexes 0~15) are supported in Table 6, and 6 TBS indexes (TBS indexes 34 to 39) may be added as listed in Table 7 to support TBS operated in a low SINR area. At this time, one MCS index per two MCS indexes is removed from the $I_{MCS}$ 0~15 defined in Table 6, whereby a new MCS table may be designed. In this case, since 64QAM is not supported for the MTC UE, $I_{MCS}$ 31 is not required in Table 6. The following Table 8 illustrates an example of MCS table for supporting QPSK and 16QAM. In Table 8, MCS index of 4 bits is defined.

TABLE 8

| MCS Index $I_{MCS}$ | Modulation Order $Q_m$ | TBS Index $I_{TBS}$ |
|---|---|---|
| 0 | 2 | 1 |
| 1 | 2 | 3 |
| 2 | 2 | 5 |
| 3 | 2 | 7 |
| 4 | 2 | 9 |
| 5 | 4 | 10 |
| 7 | 4 | 14 |

TABLE 8-continued

| MCS Index $I_{MCS}$ | Modulation Order $Q_m$ | TBS Index $I_{TBS}$ |
|---|---|---|
| 8 | 2 | 34 |
| 9 | 2 | 35 |
| 10 | 2 | 36 |
| 11 | 2 | 37 |
| 12 | 2 | 38 |
| 13 | 2 | 39 |
| 14 | 2 | reserved |
| 15 | 4 | |

The following Table 9 illustrates an example of MCS table in which MCS index of 5 bits is defined to consider lower compatibility even for the MTC UE.

TABLE 9

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 14 | 4 | 13 |
| 15 | 4 | 14 |
| 16 | 4 | 15 |
| 17 | 2 | 34 |
| 18 | 2 | 35 |
| 19 | 2 | 36 |
| 20 | 2 | 37 |
| 21 | 2 | 38 |
| 22 | 2 | 39 |
| 23 | 2 | reserved |
| 24 | 4 | |
| 25 | N/A | |
| 26 | N/A | |
| 27 | N/A | |
| 28 | N/A | |
| 30 | N/A | |
| 31 | N/A | |

If the second MCS table defined for the MCT UE is configured by 5 bits as listed in Table 6, $I_{MCS}$ indexes 0~15 (equivalent to $I_{TBS}$ indexes 0~15) and $I_{MCS}$ 29~30 are supported in Table 6, and MCS indexes for supporting TBS of a low SINR area may be configured.

Table 9 is an example of a 5-bit MCS table for the MTC UE for supporting QPSK/16QAM. At this time, only one MCS index (e.g., $I_{MCS}$ 9) of $I_{MCS}$ indexes 9 and 10 for supporting $I_{TBS}$ index 9 repeated in Table 9 may be supported.

4. 4 Method for Configuring New TBS Table

Hereinafter, as described in FIG. 10, methods for configuring a new TBS table (that is, the second TBS table) for the MTC UE will be described.

It is preferable that new TBS indexes $I_{TBS}$ 34~39 are introduced for the MTC UE to support TBS of a low SINR area. At this time, the new TBS index may be supported in the form of TBS index defined in the legacy TBS table. The following Tables 10, 11 and 12 illustrate methods for configuring $I_{TBS}$ 34~39 newly defined for the MTC UE.

In Table 10, it is assumed that a maximum TBS size that may be supported for the MTC UE is 1000 bits. In Table 10, when the number NRB of (physical) resource blocks for TBS index is determined, it is preferable that the number of (physical) resource blocks is first selected from TBS set in legacy TBS tables (that is, the first TBS table).

TABLE 10

| | $N_{RB}$ | | | | | |
|---|---|---|---|---|---|---|
| TBS index | 1 | 2 | 3 | 4 | 5 | 6 |
| 34 | | | | | 16 | 24 |
| 35 | | | | 16 | 24 | 32 |
| 36 | | | 16 | 24 | 40 | 40 |
| 37 | | | 24 | 40 | 56 | 72 |
| 38 | | 16 | 32 | 56 | 72 | 88 |
| 39 | | 24 | 56 | 72 | 88 | 120 |

If 7 TBS indexes for the MTC UE are configured, the second TBS table may be configured as listed in Table 11 below.

TABLE 11

| | $N_{RB}$ | | | | | |
|---|---|---|---|---|---|---|
| TBS index | 1 | 2 | 3 | 4 | 5 | 6 |
| 34 | | | | | | 16 |
| 35 | | | | | 16 | 24 |
| 36 | | | | 16 | 24 | 32 |
| 37 | | | 16 | 24 | 40 | 40 |
| 38 | | | 24 | 40 | 56 | 72 |
| 39 | | 16 | 32 | 56 | 72 | 88 |
| 40 | | 24 | 56 | 72 | 88 | 120 |

In Table 10 and Table 11, TBSs (e.g., 16, 24, 32), each of which size is relatively small, may be inefficient considering CRC overhead added to TB. Therefore, small TBS sizes in the corresponding TBS indexes of Table 10 and Table 11 may not be supported.

The following Table 12 is intended to reduce signaling overhead by reusing states for supporting TBS of 1000 bits or more in the legacy first TBS table without generating a new TBS index from the MCS table defined in Table 9.

TABLE 12

| | $N_{RB}$ | | | | | |
|---|---|---|---|---|---|---|
| TBS index | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 88 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | TBS1 |
| 11 | 176 | 376 | 584 | 776 | 1000 | TBS2 |
| 12 | 208 | 440 | 680 | 904 | TBS6 | TBS3 |
| 13 | 224 | 488 | 744 | 1000 | TBS7 | TBS4 |
| 14 | 256 | 552 | 840 | TBS9 | TBS8 | TBS5 |

In Table 12, in case of TBS index 6 and 1 RB allocation (that is, ($I_{TBS}$, $N_{RB}$) value), TBS value may be defined by 88 bits. ($I_{TBS}$, $N_{RB}$) indicates TBS index and TBS size according to the number of RBs which are allocated. For example, in Table 12, (1, 1) means that TBS 24 bits because $I_{TBS}$ is 1 and $N_{RB}$ is 1.

In the legacy TBS table, in case of TBS index 6 and 1 RB allocation, 328 bits are defined for support of VoIP(Voice of Internet Protocol). However, since it is not required to support VoIP for the MTC UE, corresponding bits may be replaced with 88 bits corresponding to TBS value for general data not VoIP data. Likewise, VoIP may not be supported for NB-IoT (Narrow Band Internet of Things) UEs configured to support only a bandwidth of 1RB (e.g., 1.08 Mhz) among MTC UEs. In this case, if $I_{TBS}$ indicates 6 and the smallest resource unit is allocated to the UE (for example, NRB=1), the legacy 328 bits may be replaced with 88 bits.

Also, in Table 12, TBS values may be defined to follow $(I_{TBS}, N_{RB})$ for defining another modulation scheme and RB allocation value instead of values indicated by $(10(=I_{MCS} 11), 6)$ which is $(I_{TBS}, N_{RB})$ indicating TBS corresponding to TBS1. For example, TBS1 may be defined as $I_{TBS}$ index and $N_{RB}$ value (e.g., (QPSK, 6 RB allocation)) for supporting QPSK, TBS2 may be defined as $I_{TBS}$ index and $N_{RB}$ value (e.g., (QPSK, 5 RB allocation)) for supporting QPSK, and TBS3 may be defined as $I_{TBS}$ index and $N_{RB}$ value (e.g., (QPSK, 4 RB allocation)) for supporting QPSK. As a result, a value of TBS1 may be set to 72 bits, a value of TBS2 may be set to 72 bits, and a value of TBS3 may be set to 56 bits.

4. 5 Method for Limiting NRB

Hereinafter, as other aspect of the present invention, a method for reducing signaling overhead by fixing RB allocation value supported for MTC UE will be described.

An eNB and/or a wireless access system may be configured to support only a random column of the aforementioned TBS tables (e.g., the first TBS table and the second TBS table (Tables 10 to 12)) for the MTC UE. For example, the MTC UE may obtain TBS by assuming that a valid TBS value is allocated thereto only in case of $N_{RB}$=6 or $N_{RB}$=3 and 6 from the legacy TBS table including the aforementioned TBS tables.

For example, the case to which this embodiment is applied will be described with reference to FIG. 10. The MTC UE may receive values of $I_{MCS}$ and $N_{PRB}$ through PDCCH or EPDCCH in step S1020. In step S1030, the MTC UE may derive a value of $I_{TBS}$ mapped into $I_{MCS}$, and may obtain a TBS size through the derived value $I_{TBS}$ and $N_{PRB}$. At this time, one $N_{PRB}$ value is supported for the MTC UE, the value of $N_{PRB}$ may be omitted in step S1020. However, if there are two or more $N_{PRB}$ values, the $N_{PRB}$ values may be transmitted by being included in PDCCH/EPDCCH to indicate a specific one of $N_{PRB}$ values limited to the MTC UE.

4.6 Method for Indicating a Repetition Transmission Number

As still another aspect of the present invention, TBS allocated to the MTC UE may be indicated using a repetition transmission number (shortly, repetition number) for the MTC UE in addition to $I_{TBS}$ and RB allocation.

At this time, the repetition number may be varied depending on required coverage enhancement (CE) level. For example, the eNB and/or the system may configure candidate sets of a plurality of repetition numbers and signal a suitable set of repetition numbers according to CE level of the MTC UE through a higher layer.

For example, if the candidates of the repetition numbers are set to {1, 2, 4, 8, 10, 20, 40, 60, 80, 100, 150, 200, 400}, the eNB may notify the UE of repetition number, which will be applied, such as {1, 2, 10, 40}. The following Table 12 is an example of a TBS table indicating TBS by means of ($I_{TBS}$, RB allocation, repetition number).

TABLE 13

| | ($N_{RB}$, Rep) | | | |
|---|---|---|---|---|
| TBS index | (6, Rep 1) | (6, Rep 2) | (6, Rep 3) | (6, Rep 4) |
| 34 | 24 | 72 | 152 | 328 |
| 35 | 32 | 88 | 208 | 408 |
| 36 | 40 | 120 | 256 | 504 |
| 37 | 72 | 152 | 328 | 600 |
| 38 | 88 | 208 | 408 | 712 |
| 39 | 120 | 256 | 504 | 936 |

Table 13 is a TBS table configured on the assumption of 6 RB allocation and four repetition numbers. In Table 13, ($N_{RB}$, Rep) indicates a combination of RB allocation allocated to the MTC UE and repetition numbers. Rep 1~4 are values indicating repetition numbers and may be set to different values depending on RB allocation value.

5. Apparatuses

Figure 11:
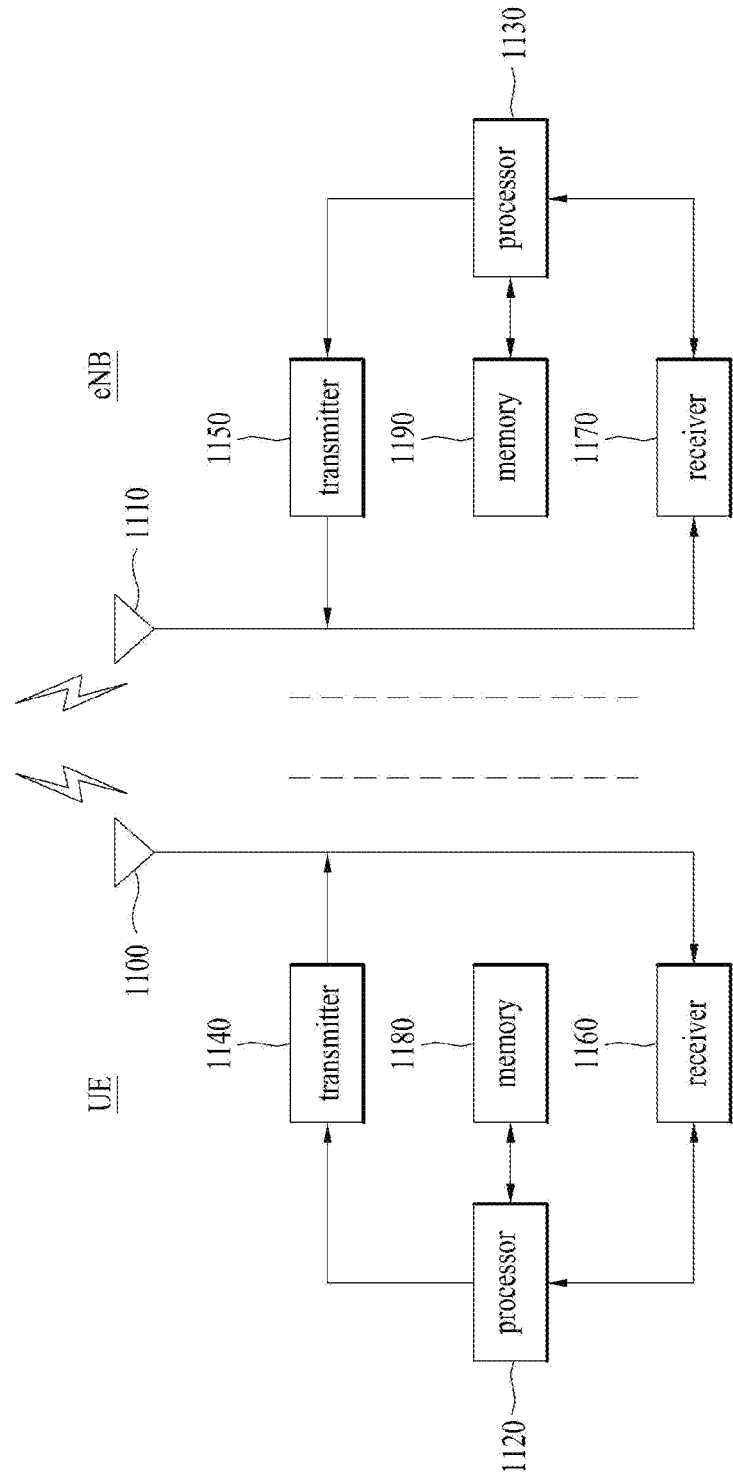
FIG. 11 is a diagram illustrating a device through which the methods described in FIGS. 1 to 10 can be implemented.

Apparatuses illustrated in FIG. 11 are means that can implement the methods described before with reference to FIGS. 1 to 10.

A UE may act as a transmitting end on a UL and as a receiving end on a DL. An eNB may act as a receiving end on a UL and as a transmitting end on a DL.

That is, each of the UE and the eNB may include a transmitter (Tx) 1140 or 1150 and a receiver (Rx) 1160 or 1170, for controlling transmission and reception of information, data, and/or messages, and an antenna 1100 or 1110 for transmitting and receiving information, data, and/or messages.

Each of the UE and the eNB may further include a processor 1120 or 1130 for implementing the afore-described embodiments of the present disclosure and a memory 1180 or 1190 for temporarily or permanently storing operations of the processor 1320 or 1330.

The UE shown in FIG. 11 is an MTC UE or NB-IoT UE, and the embodiments of the present invention may be performed using the components and functions of the aforementioned UE and the aforementioned eNB. For example, the processor of the MTC UE may functionally be connected with the receiver to receive PDCCH/E-PDCCH. Also, the processor of the MTC UE may determine $I_{TBS}$ through $I_{MCS}$ and $N_{PRB}$(or, $N'_{PRB}$) included in the received PDCCH/E-PDCCH, and may calculate or obtain TBS value by using $I_{TBS}$ and $N_{PRB}$(or, $N'_{RB}$). If MCS table for MCS and TBS table are newly defined, the processor of the MTC UE may store the legacy MCS table and/or the new MCS table and the legacy TBS table and/or the new TBS table. Afterwards, the processor of the MTC UE may receive and decode PDSCH on the basis of the obtained or calculated TBS value, or may encode and transmit PUSCH. The details may be understood with reference to the description of the sections 1 to 4.

The Tx and Rx of the UE and the eNB may perform a packet modulation/demodulation function for data transmission, a high-speed packet channel coding function, OFDMA packet scheduling, TDD packet scheduling, and/or channelization. Each of the UE and the eNB of FIG. 11 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1180 or 1190 and executed by the processor 1120 or 1130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention are applicable to various wireless access systems. Examples of the various wireless access systems include a 3GPP system, a 3GPP2 system, and/or an IEEE 802.xx system. The embodiments of the present invention are applicable to all technical fields in which the wireless access systems find their applications.

What is claimed is:

1. A method for a machine type communication (MTC) user equipment (UE) in a wireless communication system, the method comprising:
   receiving information related to a repetition number, wherein the repetition number is related to a coverage enhancement (CE) of the MTC UE;
   receiving modulation and coding scheme (MCS) information on an MCS index and resource allocation information; and
   receiving data repeatedly based on the repetition number and a transmission block size (TBS),
   wherein the TBS is determined based on a TBS index and the resource allocation information,
   wherein the TBS index is determined based on the MCS index,
   wherein the TBS index is within a predetermined range,
   wherein the predetermined range is configured to a part of TBS indexes, from 0 to 9, included in a TBS table, and
   wherein the TBS table is configured to support a legacy UE.

2. The method of claim 1, wherein the TBS is determined based on the TBS index, the resource allocation information and the repetition number.

3. The method of claim 1, wherein a bit-size of the MCS information is configured as 4.

4. The method of claim 1, wherein the TBS index is determined based on mapping relation between the MCS index and the TBS index.

5. A machine type communication (MTC) user equipment (UE) in a wireless communication system, the MTC UE comprising:
   a memory; and,
   at least one processor coupled with the memory,
   wherein the at least one processor is configured to:
   receive information related to a repetition number, wherein the repetition number is related to a coverage enhancement (CE) of the MTC UE;
   receive modulation and coding scheme (MCS) information on an MCS index and resource allocation information; and
   receive data repeatedly based on the repetition number and a transmission block size (TBS),
   wherein the TBS is determined based on a TBS index and the resource allocation information,
   wherein the TBS index is determined based on the MCS index,
   wherein the TBS index is within a predetermined range,
   wherein the predetermined range is configured to a part of TBS indexes, from 0 to 9, included in a TBS table, and
   wherein the TBS table is configured to support a legacy UE.

6. The MTC UE of claim 5, wherein the TBS is determined based on the TBS index, the resource allocation information and the repetition number.

7. The MTC UE of claim 5, wherein a bit-size of the MCS information is configured as 4.

8. The MTC UE of claim 5, wherein the TBS index is determined based on mapping relation between the MCS index and the TBS index.

9. A base station in a wireless communication system, the base station comprising:
   a memory; and,
   at least one processor coupled with the memory,
   wherein the at least one processor is configured to:
   transmit, to a machine type communication (MTC) user equipment (UE), information related to a repetition number, wherein the repetition number is related to a coverage enhancement (CE) of the MTC UE;
   transmit, to the MTC UE, modulation and coding scheme (MCS) information on an MCS index and resource allocation information; and
   transmit, to the MTC UE, data repeatedly based on the repetition number and a transmission block size (TBS);
   wherein the TBS is related to a TBS index and the resource allocation information, wherein the TBS index is related to the MCS index,
wherein the TBS index is within a predetermined range,
wherein the predetermined range is configured to a part of TBS indexes, from 0 to 9, included in a TBS table, and
wherein the TBS table is configured to support a legacy UE.

10. The base station of claim 9, wherein the TBS is determined based on the TBS index, the resource allocation information and the repetition number.

11. The base station of claim 9, wherein a bit-size of the MCS information is configured as 4.

12. The base station of claim 9, wherein the TBS index is determined based on mapping relation between the MCS index and the TBS index.

* * * * *